(12) United States Patent
Den Boestert et al.

(10) Patent No.: US 7,714,181 B2
(45) Date of Patent: May 11, 2010

(54) PROCESS TO SEPARATE COLOUR BODIES AND/OR ASPHALTHENIC CONTAMINANTS FROM A HYDROCARBON MIXTURE

(75) Inventors: Johannes Leendert Willem Cornelis Den Boestert, Amsterdam (NL); Jeroen Van Westrenen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1582 days.

(21) Appl. No.: 10/825,484

(22) Filed: Apr. 14, 2004

(65) Prior Publication Data

US 2004/0256320 A1 Dec. 23, 2004

(30) Foreign Application Priority Data

Apr. 17, 2003 (EP) .................................. 03076283

(51) Int. Cl.
*C07C 7/144* (2006.01)
(52) U.S. Cl. .................... 585/818; 208/39; 210/651
(58) Field of Classification Search ............... 585/818; 208/39; 210/651
See application file for complete search history.

(56) References Cited

U.S. PATENT DOCUMENTS

| | | | |
|---|---|---|---|
| 3,170,516 A | 2/1965 | Holland et al. | 166/23 |
| 3,250,701 A | 5/1966 | Watson et al. | 210/22 |
| 3,297,092 A | 1/1967 | Jennings | 166/207 |
| 3,992,301 A | 11/1976 | Shippey et al. | 210/23 H |
| 4,411,790 A | 10/1983 | Arod et al. | 210/637 |
| 4,537,918 A | 8/1985 | Parcevaux et al. | 523/130 |
| 4,797,159 A | 1/1989 | Spangle | 106/89 |
| 4,814,088 A | 3/1989 | Kutowy et al. | 210/651 |
| 4,921,047 A | 5/1990 | Summers et al. | 166/276 |
| 5,215,147 A | 6/1993 | Grego et al. | 166/270 |
| 5,256,297 A | 10/1993 | Feimer et al. | 210/651 |
| 5,293,938 A | 3/1994 | Onan et al. | 166/293 |
| 5,314,023 A | 5/1994 | Dartez et al. | 166/295 |
| 5,484,020 A | 1/1996 | Cowan | 166/295 |
| 5,712,314 A | 1/1998 | Surles et al. | 521/41 |
| 5,794,702 A | 8/1998 | Nobileau | 166/380 |
| 5,833,001 A | 11/1998 | Song et al. | 166/287 |
| 5,875,844 A | 3/1999 | Chatterji et al. | 166/293 |
| 5,875,845 A | 3/1999 | Chatterji et al. | 166/293 |
| 5,969,006 A | 10/1999 | Onan et al. | 523/166 |

FOREIGN PATENT DOCUMENTS

| | | |
|---|---|---|
| EP | 0325541 A1 | 7/1989 |
| FR | 2180446 | 4/1972 |
| WO | WO 99/02818 | 1/1999 |
| WO | WO 99/06670 | 2/1999 |
| WO | WO 99/27036 | 6/1999 |
| WO | WO 0110540 A2 * | 2/2001 |
| WO | WO 03/035803 A1 | 5/2003 |
| WO | WO 03035803 A1 * | 5/2003 |

\* cited by examiner

*Primary Examiner*—Glenn Caldarola
*Assistant Examiner*—Randy Boyer
(74) *Attorney, Agent, or Firm*—Charles W. Stewart

(57) ABSTRACT

Process for separating colour bodies and/or asphalthenic contaminants from a hydrocarbon mixture using a membrane having a feed side and a permeate side, by contacting the hydrocarbon mixture with the feed side of the membrane, wherein between the feed and permeate sides of the membrane a pressure difference is applied, thereby passing part of the hydrocarbon mixture from the feed side to the permeate side and obtaining at the permeate side of the membrane a hydrocarbon permeate having a reduced content of colour bodies and/or asphalthenic contaminants, and by removing the hydrocarbon permeate from the permeate side of the membrane, wherein during selected time intervals the removal of hydrocarbon permeate from the permeate side of the membrane is stopped so that the pressure difference over the membrane is temporarily substantially lowered.

16 Claims, 1 Drawing Sheet

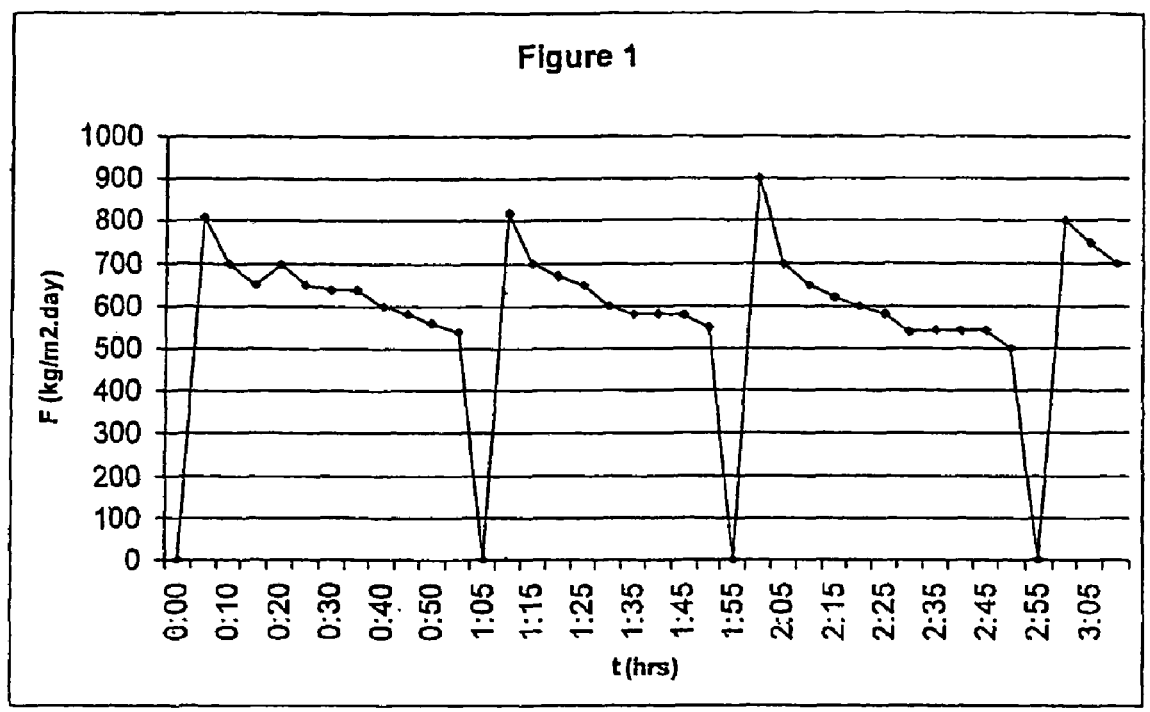

PROCESS TO SEPARATE COLOUR BODIES AND/OR ASPHALTHENIC CONTAMINANTS FROM A HYDROCARBON MIXTURE

The invention is directed to a process for separating colour bodies and/or asphalthenic contaminants from a hydrocarbon mixture using a membrane.

One type of membrane separation process is disclosed in WO-A-9927036. This publication discloses a process for preparing lower olefins by means of the well-known steam cracking process from a contaminated feedstock. Prior to feeding the feedstock to the steam cracker furnaces the contaminants are removed from the feedstock by means of a membrane separation. By removing contaminants from the feed in this manner it is possible to use, for example, so-called black condensates as feedstock for preparing lower olefins. The term black condensates is commonly used to refer to contaminated natural gas condensates having an ASTM colour of 3 or more. Direct application of these relatively cheap feedstocks in the above steam cracker process would not be possible because the contaminants and/or colour bodies in the feed would give rise to excessive coke formation in convection sections and associated steam cracker furnaces.

A disadvantage of the process according to WO-A-9927036 is that the flux, expressed in feed permeating through the membrane per square meter per day decreased quickly from a maximum value of around for example 1200 kg/m$^2$·day to non-economical lower values.

An object of the present invention is to provide a process, which can be operated over a prolonged time period at a high average flux.

In accordance with the present invention there is provided a process for separating colour bodies and/or asphalthenic contaminants from a hydrocarbon mixture using a membrane having a feed side and a permeate side, by contacting the hydrocarbon mixture with the feed side of the membrane, wherein between the feed and permeate sides of the membrane a pressure difference is applied, thereby passing part of the hydrocarbon mixture from the feed side to the permeate side and obtaining at the permeate side of the membrane a hydrocarbon permeate having a reduced content of colour bodies and/or asphalthenic contaminants, and by removing the hydrocarbon permeate from the permeate side of the membrane, wherein during selected time intervals the removal of hydrocarbon permeate from the permeate side of the membrane is stopped so that the pressure difference over the membrane is temporarily substantially lowered.

FIG. 1 is a plot presenting the experimental results from the testing of a membrane separation unit showing the flux F of permeate as a function of time t.

Applicants observed that the flux of hydrocarbon permeate would decrease during normal separation operation over the membrane with operation time from an initial maximum value. It was found that stopping the removal of hydrocarbon permeate from the permeate side of the membrane results in a substantial lowering of the pressure difference over the membrane, since part of the feed mixture continues to permeate through the membrane. Because permeate removal is stopped, this results in an increase of the pressure at the permeate side, approaching the higher pressure at the feed side, ultimately until the pressures at both sides have gradually equilibrated.

Applicant also found that by substantially reducing the pressure difference in this way, after the flux of permeate had reached a certain minimal acceptable value, it was found possible to operate the membrane separation at the original maximum flux when the normal membrane separation was resumed by removing permeate from the permeate side of the membrane again. In most cases the retentate is or can be recycled and mixed with fresh feed, so that the fact that for a certain time interval no or limited separation takes place is not experienced as a problem for the retentate composition.

The pressure equilibration is a gradual process, the speed of which is dependent on the permeability of the membrane at the operating conditions. The lowest pressure difference that is achieved can therefore depend on the length of the time interval during which the removal of permeate is stopped. The expression substantial lowering of the pressure difference is used to refer to any lowering of pressure difference which proves sufficient in a practical situation for restoring the permeate flux to the original maximum when the permeate flux is resumed. Suitably, a substantial lowering is a lowering of the pressure difference by 20% or more, preferably 50% or more, more preferably by 90% or more. When the removal of permeate is stopped for a sufficiently long time interval, the pressures can also fully equilibrate such that a zero pressure difference is achieved. When the time interval is not long enough for full pressure equilibration, still a substantial lowering of the pressure difference can be achieved, at least temporarily at the end of the time interval.

Thus a simple process was obtained which does not require the more complex back flushing operation, and also does not require any special manipulation of operation at the feed side of the membrane.

Back flushing of permeate through the membrane is sometimes used within membrane and or filtration processes to improve the flux over a membrane. A disadvantage of back flushing is that it is more complex to control and it requires for example more equipment such as back flushing pumps and will produce more of an unwanted black by-product. Also, in the case that the membrane is formed by a thin top layer made of a dense membrane and a support layer made of a porous membrane, back flushing of permeate will almost certainly cause damage of the thin dense membrane, and can therefore not be applied. Further advantages and preferred embodiments will be described below.

International patent application No. PCT/EP02/11712, which was not published at the date of filing of the present application, describes a process to separate colour bodies and/or asphalthenic contaminants from a hydrocarbon mixture by passing part of the hydrocarbon mixture through a membrane over which membrane a pressure difference is maintained thereby obtaining a hydrocarbon permeate having a reduced content of colour bodies and/or contaminants, wherein at selected time intervals the pressure difference over the membrane is substantially lowered by stopping the flow of the hydrocarbon mixture to the feed side of the membrane. Stopping the feed flow can for example be achieved by stopping the operation of a feed pump, or by recycling the hydrocarbon mixture from a position between the feed pump and the membrane to a position upstream of the feed pump.

An advantage of the present invention is that the pressure difference between feed side and permeate side of the membrane is substantially lowered without releasing the pressure at the feed side. This minimises mechanical stress to the equipment at the feed side. Also, releasing the pressure at the feed side at elevated temperatures can result in flashing of lighter components of the hydrocarbon feed mixture, which can result in an undesirable vapour-lock when restarting the feed supply to the membrane. This phenomenon limits the maximum temperature at which the membrane can be operated. When the pressure difference is lowered by stopping the removal of permeate according to the present invention, the membrane can be operated at higher temperatures. If flashing of lighter components occurs at the permeate side this is normally not a problem since there are normally no pumps at the permeate side.

It is a further advantage of the present invention that permeation of feed through the membrane continues during at least part of the intervals wherein the permeate removal is stopped. When the permeate removal is resumed by opening a valve in the removal conduit, instantaneously a peak flow of permeate is observed due to a release of the pressure at the permeate side that was built up during stopped flow. In this way the produced amount of hydrocarbon permeate over time is further maximised.

It is yet a further advantage that the cross-flow of feed along the membrane surface at the feed side continues while the pressure difference is lowered. Therefore, any contaminants which are released from the membrane at the feed side are effectively carried away.

The hydrocarbon mixtures will contain contaminants and/or colour bodies, which will give the hydrocarbon mixture a darkish colour. The process of this invention is not limited for use with feedstocks above a certain colour index. It was found to be particularly useful for hydrocarbon mixtures having an ASTM colour index above 2, in particular of 3 or more, as determined in accordance with ASTM D1500. The ASTM colour of the permeate is found to be lower than 2 and sometimes even lower than 1, depending on the colour of the hydrocarbon feed and operating conditions of the membrane separation process. The process of the present invention can result in a lowering of the dimensionless colour index by 10% or more, preferably by 30% or more, and most preferably by 50% or more.

The contaminants and/or colour bodies are typically hydrocarbons with high boiling points and which do not easily vaporise, even in the presence of steam. Examples of such hydrocarbons are polynuclear aromatics, polynuclear cycloparaffins, large paraffinic hydrocarbons (waxes), and olefinic components such as polynuclear cycloolefins and large olefinic hydrocarbons, especially diolefins.

The hydrocarbon mixtures to be used in the process according to the present invention are suitably hydrocarbon mixtures having an initial boiling point of greater than 20° C. and a 80% recovery point of less than 600° C., preferably a 95% recovery point of less than 600° C., more preferably with a 95% recovery point of less than 450° C., and even more preferable a 95% recovery point of less than 350° C. determined by ASTM D-2887. Such hydrocarbon mixtures can be crude petroleum fractions, (contaminated) natural gas condensates or (contaminated) refinery streams. An example of a suitable hydrocarbon mixture is a naphtha (a straight-run gasoline fraction) and/or a gas oil (a distillate, intermediate in character between kerosene and light lubricating oils) fraction, which has been contaminated in the storage tank or in the pipeline when transporting said fraction from a refinery to a steam cracker. Another example of a hydrocarbon mixture, which may suitably be used, is the above referred to black condensate, which is a contaminated natural gas condensate. The natural gas condensates normally have an ASTM colour of below 1. Contamination occurs when such gas condensates are stored in storage vessels or transported via pipelines through which also, for example, crude oils are stored/transported. Natural gas condensates are typically mixtures comprising substantially, i.e. more than 90 wt %, of $C_5$ to $C_{20}$ hydrocarbons or more typically $C_5$ to $C_{12}$ hydrocarbons.

The membrane suitably comprises a top layer made of a dense membrane and a base layer (support) made of a porous membrane. The membrane is suitably so arranged that the permeate flows first through the dense membrane top layer and then through the base layer, so that the pressure difference over the membrane pushes the top layer onto the base layer. The dense membrane layer is the actual membrane which separates the contaminants from the hydrocarbon mixture. The dense membrane, which is well known to one skilled in the art, has properties such that the hydrocarbon mixture passes said membrane by dissolving in and diffusing through its structure. Preferably the dense membrane layer has a so-called cross-linked structure as for example described in WO-A-9627430. The thickness of the dense membrane layer is preferably as thin as possible. Suitably the thickness is between 1 and 15 micrometer, preferably between 1 and 5 micrometer. The contaminants and colour bodies are not capable to dissolve in said dense membrane because of their more complex structure and high molecular weight. For example, suitable dense membranes can be made from a polysiloxane, in particular from poly(di-methyl siloxane) (PDMS). The porous membrane layer provides mechanical strength to the membrane. Suitable porous membranes are PolyAcryloNitrile (PAN), PolyAmideImide+$TiO_2$ (PAI), PolyEtherImide (PEI), PolyVinylideneDiFluoride (PVDF), and porous PolyTetraFluoroEthylene (PTFE), and can be of the type commonly used for ultrafiltration, nanofiltration or reverse osmosis.

The process according to the invention can be conducted such that the removal of hydrocarbon permeate is stopped repeatedly, at regularly spaced time intervals, such that it comprises first time intervals at which the actual separation takes place and a high flux is achieved, alternated with second time intervals at which the removal of hydrocarbon permeate is stopped, i.e. during which time intervals the pressure difference over the membrane is gradually substantially lowered when compared to the first time periods. It is, however, also possible to monitor a parameter of the separation process such as the flux rate of permeate, or a colour index, and to interrupt the removal of permeate only if a certain predetermined condition is fulfilled, such as a minimum allowable permeate flow rate.

After the second time intervals it was found possible to operate the membrane separation at substantially the original high flux again, without significant deterioration over prolonged times of operation.

Without wanting to limit the invention in any manner, it is believed that the following mechanism contributes to prevent degrading membrane performance due to deposits of colour bodies and/or asphalthenic contaminants on the membrane surface. During operation, the dense membrane is swollen significantly, due to the hydrocarbon that is dissolved in and diffusing through the membrane. I.e., the thickness of the dense membrane is increased during operation, although the swelling is somewhat counteracted by the pressure difference over the membrane. When the pressure difference is significantly lowered, it is believed that the dense membrane can expand so that its thickness increases, thereby loosening any deposits on the membrane surface.

During separation the pressure difference across the membrane is typically between 5 and 60 bar and more preferably between 10 and 30 bar. During the time interval at which the pressure difference is lowered the pressure difference can be between 0 and 5 bar, in particular below 1 bar and also 0 bar. Suitably the pressure difference is lowered by 20% or more, preferably 50% or more, more preferably by 90% or more.

The present invention can be applied in parallel-operated (groups of) membrane separators comprise a single separation step, or in embodiments comprising two or more sequential separation steps, wherein the retentate of a first separation step is used as the feed for a second separation step.

One skilled in the art can easily determine the optimal time periods of continuous separation and the time intervals at which the removal of permeate is stopped. Maximising the average flux over the membrane separator will drive such determination. With average flux is here meant the average permeate flux over both separation and intermediate time intervals. Thus it is desirable to minimise the time periods at which the permeate flux is stopped and maximising the time period at which separation takes place. The flux will decrease in the separation intervals and suitably when the flux becomes less than 75-99% of its maximum value the separation interval is stopped. Suitably between 5 and 480 minutes of continuous separation across the membrane alternates with time periods of between 1 and 60 minutes, preferably below 30 minutes and more preferably below 10 minutes and most preferably below 6 minutes of at which the removal of permeate is stopped.

The membrane separation is suitably carried out at a temperature in the range of from −20 to 100° C., in particular 10 to 100° C., and suitably in the range of 40-85° C. The wt % recovery of permeate on feed is typically between 50 and 97 wt % and often between 80 and 95 wt %.

The invention will be described by means of the following non-limiting example.

EXAMPLE

A black condensate having the properties as listed in Table 1 was fed at a rate of 70 kg/hour to a membrane separation unit, wherein part of the retentate was recycled and mixed with fresh feed so that the flow rate of fluid over the feed side of the membrane was 1000 kg/hour. The membrane separation unit was provided with 1.5 m² of a PDMS/PAN 150 membrane as obtained from GKSS Forschungszentrum GmbH (a company having its principal office in Geesthacht, Germany) comprising a top layer of PolyDiMethylSiloxane (PDMS) and a supporting layer of a PolyAcryloNitrile (PAN). The pressure difference when separating was 20 bar, wherein the pressure at the permeate side was nearly atmospheric. The operation temperature was 70° C. The colour properties of the permeate was an ASTM colour of 1.5.

The total experiment time was 24 hours. After every approximately 55 minutes of normal separation the flow of permeate was manually stopped by closing a valve in the permeate removal conduit retentate for 5 minutes. During this time, the pressure at the permeate side was found to approach the pressure at the feed side to within 1 bar.

FIG. 1 shows the flux F of permeate (in kg/(m²·day) as a function of time t (hours). The flux in FIG. 1 declines during normal separation significantly from a maximum value of ca. 820 kg/(m²·day), which is thought to be due to the deposition of colour bodies on the feed side of the membrane. The maximum value is the value observed using a new membrane. The steady decline of permeate flux would continue if the permeate flux was not stopped after 55 minutes by closing a valve. When the valve is reopened again after 5 minutes, permeate flux is resumed at about the original maximum flux value. The maximum permeate flux and subsequent decline pattern could be observed after stopped permeate flow according to the invention during the entire 24 hour period of the experiment. Time t=0 in the FIGURE represents a time in the course of the experiment after a steady state had been reached.

TABLE 1

| properties black condensate | |
|---|---|
| density at 15° C., kg/m3 | 776.9 |
| components not volatile at 343° C. | 17 wt % |
| components not volatile at 538° C. | 0.7 wt % |
| ASTM Colour (ASTM D1500) | 3 |

When a pristine membrane is used for the first time in a separation process for a hydrocarbonaceous feed, it will normally take an initial period before a steady state in the membrane performance is achieved. One factor that plays a role in this is swelling of the membrane. Typically, such an initial period will take in the order of a few hours, in particular less than 10 hours, such as 2 hours. If the removal of hydrocarbon permeate from the permeate side is stopped e.g. every 20-60 minutes for a few minutes such as less than 10 minutes, this means that the maximum flux observed during the first few cycles can vary slightly. Maximum flux differences in this initial period are typically less than 20%. The maximum flux that is observed once the steady state is reached in a new membrane is considered as the original flux. Once the steady state is reached, the maximum flux observed in the process of the present invention varies typically less than about 10%, often less than 5% if some outliers are disregarded, over periods of several days.

The process according to the invention is suitable to be used to separate contaminants from a feed, especially the referred to black condensates, for a steam or naphtha cracker of which WO-A-9927036 describes an example. The retentate which contains an increased concentration of contaminants may be supplied to the fractionation column downstream the steam cracker furnaces. Preferably the retentate is supplied to a crude distillation column of a refinery because the various components of the retentate are also found in the crude petroleum feedstock normally supplied to said crude distillation column.

Accordingly, the present invention further provides a process according to any one of claims 1-15, wherein the hydrocarbon mixture is a liquid hydrocarbon feed from which light olefins are to be produced by thermal cracking, wherein the membrane forms part of a membrane separation unit in which the hydrocarbon permeate is removed from the permeate side of the membrane, and wherein a retentate is removed from the retentate side of the membrane, and wherein the process further comprises the steps of:

(a) supplying the permeate to the inlet of a cracking furnace, allowing the permeate to crack in the coils of the cracking furnace in the presence of steam at elevated temperature and removing from the cracking furnace a cracked stream which is enriched in light olefins;

(b) quenching the cracked stream;

(c) supplying the cooled cracked stream to a fractionation column;

(d) removing the retentate, preferably by supplying it to the fractionation column or to a crude distiller; and (e) removing from the top of the fractionation column a gaseous stream, from the side of the fractionation column a side stream of fuel oil components and from the bottom of the fractionation column a bottom stream.

Thus, using the present invention the known process is improved in order that it can be operated over a significantly prolonged time period at a high average flux. This is achieved by replacing the feed supply and membrane separation step of the known process by the step of supplying the feed to the inlet of a membrane unit provided with a membrane, over which membrane a pressure difference is maintained, thereby obtaining at the permeate side of the membrane a permeate having a reduced content of colour bodies and/or contaminants, and at the retentate side of the membrane a retentate, and removing the permeate and the retentate from the membrane, wherein during selected time intervals the removal of hydrocarbon permeate from the permeate side of the membrane is stopped so that the pressure difference over the membrane is temporarily substantially lowered.

Suitably, the membrane in step (a) comprises a dense membrane layer as described hereinbefore, which allows hydrocarbons from the feed, but not asphalthenes or colour bodies to pass through the membrane by dissolving in and diffusing through its structure. Such a membrane is suitably also used when the hydrocarbon feed further contains salt contaminants, which are present in water droplets that are dispersed in the hydrocarbon feed. Salt contaminants can come from formation water or from other treatments at a refinery, examples of contaminating salts are sodium chloride, magnesium chloride, calcium chloride and iron chloride. Other salts, such as sulphates may be present as well. The water and/or salt will normally not be dissolved in the dense membrane, and therefore the permeate will be free from salt.

Details and ranges of operation parameters for the membrane are given in the description hereinbefore and in the example. Details about the cracking process, feeds used and products obtained are disclosed in WO-A-9927036, in particular in the example.

That which is claimed is:

1. A process for separating colour bodies and/or asphalthenic contaminants from a hydrocarbon mixture using a membrane having a feed side and a permeate side, by
    contacting the hydrocarbon mixture with the feed side of the membrane, wherein between the feed side and permeate side of the membrane a pressure difference is applied, thereby passing part of the hydrocarbon mixture from the feed side to the permeate side and
    obtaining at the permeate side of the membrane a hydrocarbon permeate having a reduced content of colour bodies and/or asphalthenic contaminants, and by removing the hydrocarbon permeate from the permeate side of the membrane,
    wherein during selected time intervals the removal of hydrocarbon permeate from the permeate side of the membrane is stopped so that the pressure difference over the membrane is temporarily substantially lowered,
    wherein during the process, a feed pressure level at the feed side is maintained at least as large as a permeate pressure level at the permeate side, so that the pressure difference is maintained at zero or greater.

2. A process according to claim 1, wherein the membrane comprises a top layer made of a dense membrane and a support layer made of a porous membrane.

3. process according to claim 2, wherein the dense membrane is made from a polysiloxane such as a poly(di-methyl siloxane).

4. A process according to claim 3, wherein the pressure difference across the membrane is lowered by at least 20%.

5. A process according to claim 4, wherein the pressure difference across the membrane during separation is between 10 and 30 bar.

6. A process according to claim 5, wherein the pressure difference is lowered to 0 bar.

7. A process according to claim 6, wherein time periods of between 5 and 480 minutes of continuous separation across the membrane alternate with time intervals of between 1 and 60 minutes at which the removal of permeate is stopped.

8. A process according to claim 7, wherein the time interval at which the permeate removal is stopped is below 30 minutes.

9. A process according to claim 8, wherein the removal of hydrocarbon permeate from the permeate side is stopped at regular intervals.

10. A process according to claim 9, wherein the hydrocarbon permeate is removed from the permeate side of the membrane through a conduit including a permeate valve, which valve is closed during the selected time intervals so as to stop the removal of permeate.

11. A process according to claim 10, wherein the membrane is operated at a temperature of above 40.degree. C.

12. A process according to claim 10, wherein the membrane is operated at a temperature of above 65.degree. C.

13. A process according to claim 12, wherein the hydrocarbon mixture has an initial boiling point greater than 20.degree. C. and a 80% recovery point of less than 600.degree. C., determined by ASTM D2887.

14. A process according to claim 13, wherein the hydrocarbon mixture has an ASTM D1500 colour index of above 2.

15. A process according to claim 14, wherein the hydrocarbon mixture is a contaminated natural gas condensate or a contaminated refinery stream.

16. A process according to claim 15, wherein the hydrocarbon mixture is a liquid hydrocarbon feed from which light olefins are to be produced by thermal cracking, wherein the membrane forms part of a membrane separation unit in which the hydrocarbon permeate is removed from the permeate side of the membrane, and wherein a retentate is removed from the retentate side of the membrane, and wherein the process further comprises the steps of: (a) supplying the permeate to the inlet of a cracking furnace, allowing the permeate to crack in the coils of the cracking furnace in the presence of steam at elevated temperature and removing from the cracking furnace a cracked stream which is enriched in light olefins; (b) quenching the cracked stream; (c) supplying the cooled cracked stream to a fractionation column; (d) removing the retentate, preferably by supplying it to the fractionation column or to a crude distiller, and (e) removing from the top of the fractionation column a gaseous stream, from the side of the fractionation column a side stream of fuel oil components and from the bottom of the fractionation column a bottom stream.

* * * * *